UNITED STATES PATENT OFFICE.

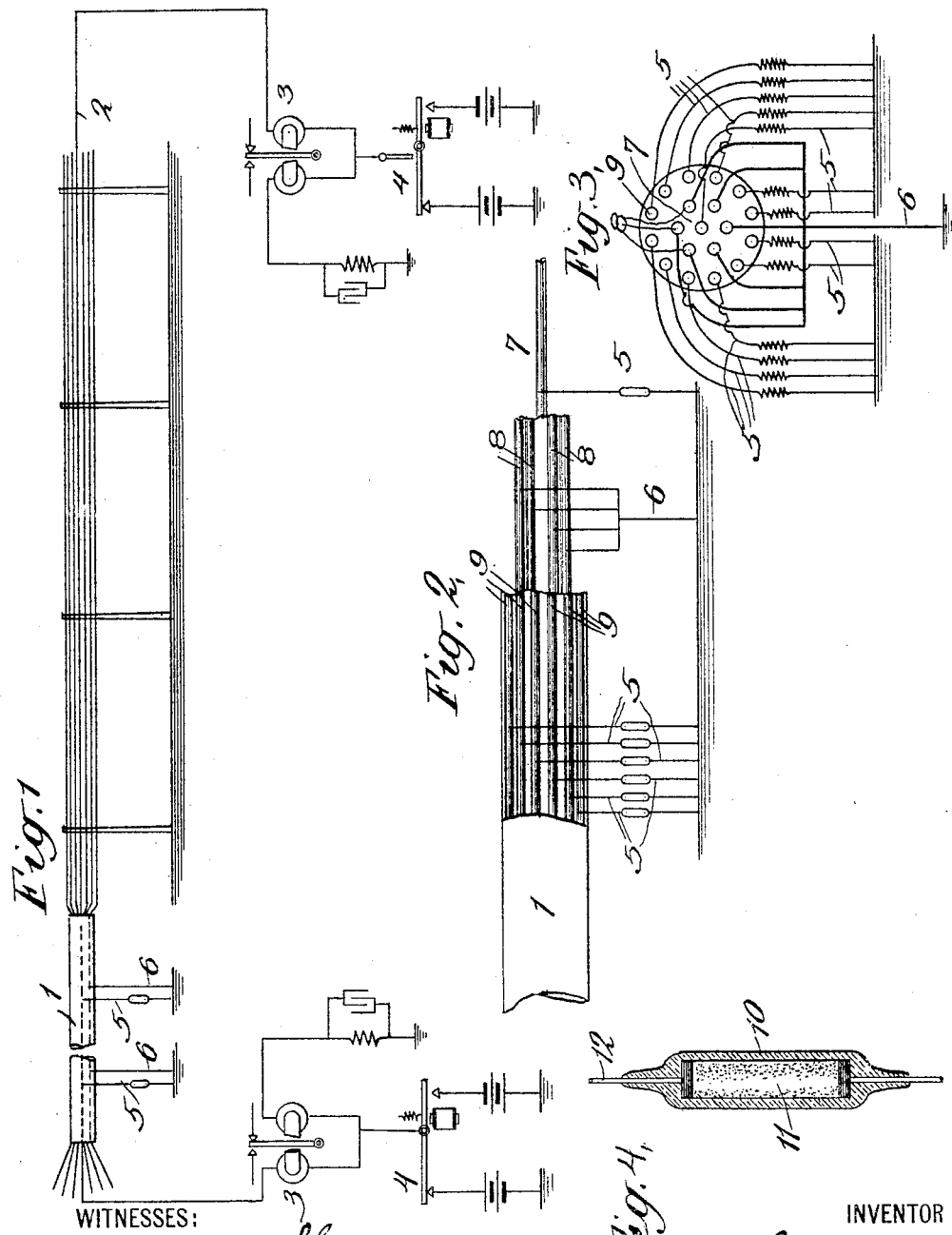

JOHN C. BARCLAY, OF NEW YORK, N. Y.

TELEGRAPH AND TELEPHONE LINE AND THE LIKE.

No. 801,130.　　　　　Specification of Letters Patent.　　　　　Patented Oct. 3, 1905.

Application filed June 3, 1905. Serial No. 263,538.

*To all whom it may concern:*

Be it known that I, JOHN C. BARCLAY, a citizen of the United States, residing at New York, in the county of New York and State of New York, have invented certain new and useful Improvements in Telegraph and Telephone Lines and the Like; and I do hereby declare the following to be a full, clear, and exact description of the invention, such as will enable others skilled in the art to make and use the same.

My invention relates generally to improvements in cable-lines employed for the transmission of telegraphic and telephonic messages and the like, and particularly to means for overcoming induction and static disturbances in cable-lines and composite lines composed partly of cable and partly of "open" wires, (by which latter term I mean separate conductors as distinguished from cabled conductors, whether such separate conductors are supported on poles and are bare wires insulated by glass or porcelain insulators, as in common telegraph and telephone practice, or whether a plurality of such wires are supported on the same poles, or whether such wires have each a covering separate and distinct from that of the other wires so supported.)

It is frequently necessary in telegraph and telephone practice and the like to employ considerable lengths of cable, the several conductors of which, some or all, form parts of much longer circuits composed in the main of open wires, which latter are usually bare wires supported on poles and insulated in the ordinary manner. In the use of such circuits troubles have been experienced which are not merely what would be expected from the increase of static capacity of the circuits due to the necessarily high static capacity of the conductors of cables as ordinarily constructed and laid or strung and from the increase of inductive inteference due to the close proximity of the conductors in the cables. To the contrary, the troubles experienced with such lines are abnormal and are due to the composite character of the lines. Thus in a particular instance in a circuit composed of about five hundred miles of bare overhead wire supported on poles and insulated in the ordinary manner and of about thirty-five miles of cable, the latter at one end of the circuit, it was found that during dry weather when the insulation of the bare wire was good and its static capacity high in consequence the static charge of a large part of this bare wire seeking the most direct path discharged at the cable end of the line, while a rainstorm in even a small portion of the region through which the bare-wire portion of the circuit passed or any other condition which decreased for the time being the insulation of the bare wire changed very greatly the discharge at the cable end of the line, a great part of the discharge occurring where the insulation was temporarily reduced. The fluctuations in capacity of the line thus produced were very great, and the line being operated as a duplex telegraph-circuit it was very difficult to balance as to capacity, and excessive capacity was required in the artificial line at the cable end of the circuit during dry weather. Other conductors of the cable being employed in other similar circuits, it was found that the inductive interference between the circuits, due partly to their high capacity, was so excessive as to make it practically impossible to use more than one conductor of the cable at a time.

Under conditions such as mentioned, according to my invention, I proceed as follows: To remedy the inductive interference between different circuits, I select certain of the conductors of the cable as anti-induction conductors and ground them at short intervals—say of half a mile—thereby producing circuits of relatively low resistance which absorb substantially all of the inductive effect of the remaining or "working" conductors. This has the effect of overcoming the inductive interference between different circuits, but increases greatly the capacity of the working circuits, thus increasing the retardation in said circuits and the other troubles above mentioned. To overcome these difficulties, therefore, I provide the working conductors at intervals with ground connections or leaks of high resistance at intervals of, say, half a mile. These ground connections serve to dissipate the static charge of the line, so that its capacity becomes relatively low and the retardation small, while because of the high resistance of the ground connections the loss of current through them is very small. I am able thereby to reduce the static disturbances, due not only to the necessarily high inductive capacity of the cable insulation, but also due to the grounded anti-induction conductors, to a minimum and cause the several circuits to work rapidly and efficiently.

In the accompanying drawings I illustrate diagrammatically the application of my said invention.

In said drawings, Figure 1 shows diagrammatically a composite telegraph-circuit comprising one conductor of a multiconductor-cable and an ordinary single wire supported as customary in telegraph work, circuits and instruments for duplex transmission over said line being indicated at the ends thereof. Fig. 2 shows a detail diagrammatic view of a portion of a cable as used according to my invention, the several layers of conductors of the cable being broken away successively to illustrate the connection of different conductors to ground. Fig. 3 shows diagrammatically a cross-section of the cable and the connections of the different conductors thereof to ground. Fig. 4 shows a detail sectional elevation of one form of resistance device which may be employed in the ground connections of the working conductors of the cable.

In Fig. 1 numeral 1 designates the cable, and 2 a single conductor or wire connected in circuit with one of the conductors of said cable, the circuit being therefore a composite circuit such as described. The return of this circuit is through ground, as is customary in telegraph practice, the ground forming a conductor equivalent to a return-conductor. Numerals 3 designate receiving-relays, numerals 4 designate transmitters, all arranged for duplex operation. The several working conductors of the cable are provided with high-resistance return or ground connections 5 at suitable intervals. Said connections serve to dissipate the static charge of the line, thereby eliminating the static disturbances due to insulation and the anti-induction conductors. I do not limit myself to any particular distance apart of these ground connections.

For the anti-induction conductors I preferably employ conductors which are substantially equidistant from all of the working conductors of the cable. In the cable illustrated in Figs. 2 and 3 there is a central core-wire and two concentric rows of conductors surrounding said core, and I have shown the core-wire 7 and the outer wires 9 as provided with high-resistance ground connections 5, wires 7 and 9 being therefore the working conductors. The intermediate wires 8 I have shown provided with low-resistance ground or return connections 6, these wires 8 being therefore the anti-induction wires. I do not limit myself, however, to the selection of any particular wire or group of wires for use as anti-induction wires, but may use any suitable wire or wires of the cable for the purpose.

The ground connections of both the working conductors and of the anti-induction conductors are preferably situated at the test-boxes which are commonly provided at intervals along telegraph and telephone lines.

While I do not limit myself to the use of any particular form of high-resistance device for inclusion in the ground connections of the working conductors, Fig. 4 shows one device suitable for the purpose. It comprises a carbon pencil 10, inclosed within a vitreous glaze or enamel 11 and provided with terminal wires 12, projecting through the said glaze or enamel. Such resistance devices are readily applied, are constant in resistance when once applied, being entirely unaffected by moisture, and a large number of them may be located in a very small space. Moreover, they are relatively inexpensive.

I am aware that it has been proposed heretofore to provide insulated conductors with ground connections of high resistance at intervals to dissipate the static charge of the line; but the use of such connections in multiconductor-cables in combination with anti-induction conductors to reduce the otherwise excessive capacity due to the use of such anti-induction conductors I believe to be new; likewise their use in composite lines to prevent discharge of the single conductor through the cable, as above described.

What I claim is—

1. In a system of signaling, the combination with a plurality of signaling-circuits comprising conductors of a multiconductor-cable, said conductors provided with high-resistance return connections, of an anti-induction conductor in said cable provided with low-resistance ground connections.

2. In a system of signaling, the combination with a plurality of signaling-circuits comprising conductors of a multiconductor-cable, and return connections for said conductors comprising high resistance, of means for preventing inductive interference between said conductors comprising anti-induction circuits of low resistance having conductors in proximity to said before-mentioned conductors of the cable.

3. In a system of signaling, the combination with a plurality of signaling-circuits comprising conductors of a multiconductor-cable, and return connections for said conductors comprising high resistance, of anti-induction circuits of low resistance comprising conductors in said cable located substantially equidistant from said other conductors.

4. In a system of signaling, the combination with a composite line comprising a section of insulated conductor of relatively high capacity in proportion to its length and a bare conductor of relatively lower capacity in proportion to its length, and signal-transmitting means for said line, of one or more high-resistance return connections for said insulated conductor, located intermediate the ends thereof.

5. In a system of signaling, the combination with a composite line comprising one conductor of a multiconductor-cable and a single wire, and signal-transmitting means for said line, of one or more high-resistance return connections for said insulated conductor, located intermediate the ends thereof, and anti-induction means for the cable comprising circuits of low resistance having conductors in proximity to the working conductors of the cable.

In testimony whereof I affix my signature in the presence of two witnesses.

JOHN C. BARCLAY.

Witnesses:
H. M. MARBLE,
C. A. VAN BRUNT.